United States Patent [19]

Urban

[11] 4,358,427
[45] Nov. 9, 1982

[54] REMOVAL OF HYDROGEN SULFIDE FROM GEOTHERMAL STEAM

[75] Inventor: Peter Urban, Northbrook, Ill.

[73] Assignee: UOP Inc., Des Plaines, Ill.

[21] Appl. No.: 321,289

[22] Filed: Nov. 13, 1981

[51] Int. Cl.$^3$ .............................................. B01D 53/36
[52] U.S. Cl. .................................... 423/230; 423/523; 423/529; 423/571
[58] Field of Search ............... 423/230, 571, 573, 523, 423/529, DIG. 19

[56] References Cited

U.S. PATENT DOCUMENTS 3,972,988 8/1976 Urban .................................. 423/571
4,196,183 4/1980 Li ..................................... 423/573 G

*Primary Examiner*—Earl C. Thomas
*Attorney, Agent, or Firm*—James R. Hoatson, Jr.; Louis A. Morris; William H. Page, II

[57] ABSTRACT

A process for removing hydrogen sulfide from geothermal steam comprising adding free oxygen to the steam and contacting the steam with an oxidation catalyst at a pressure of at least 30 psig and a temperature not greater than the saturation temperature of the steam. The catalyst may comprise activated carbon, a refractory inorganic oxide or a metal phthalocyanine and is wetted with an aqueous solution of thiosulfates, sulfates or polysulfides. The hydrogen sulfide is converted and steam of reduced hydrogen sulfide content is obtained.

13 Claims, No Drawings

REMOVAL OF HYDROGEN SULFIDE FROM GEOTHERMAL STEAM

BACKGROUND OF THE INVENTION

Geothermal steam which is steam found trapped in the earth is a potentially valuable source of energy, particularly in view of the ever increasing need to decrease reliance on fossil fuels, such as obtained from imported oil, as an energy source. Geothermal steam, like any high pressure steam, may be used, for example, to drive a turbine and generate electricity. Unfortunately, geothermal steam almost always contains contaminants such as $CO_2$, $CH_4$, $NH_3$ and, most troublesome, $H_2S$.

Obviously, $H_2S$ is a problem when geothermal steam is used as a source of energy from the standpoint of contamination of the environment, but it is also a problem with respect to its corrosive effect on the power generating equipment. The $H_2S$ is, therefore, ideally removed from the high pressure steam upstream of the power generating equipment. Many efforts are known in the art to have been made to accomplish that end.

U.S. Pat. No. 4,196,183 to Li discloses a process for removing $H_2S$ from geothermal steam by adding free exygen to the steam and contacting the mixture with an activated carbon catalyst at a temperature above the saturation temperature of the steam. In Li's process the $H_2S$ is oxidized to free sulfur which is adsorbed on the activated carbon and which periodically must be removed therefrom. Li explains in his text that the superheating is necessary "to prevent binding of active catalyst sites by moisture."

U.S. Pat. No. 3,972,988 to Urban discloses a two-stage process for obtaining free sulfur from an aqueous sulfide solution. In the first stage, the sulfide is converted to a polysulfide which is then mixed with steam and decomposed to form a mixture which might be considered analogous to geothermal steam in that it comprises vapor containing $H_2O$, $H_2S$ and $NH_3$. This vaporous mixture is then mixed with air and contacted with a metal phthalocyanine catalyst in a second stage at a pressure not greater than 20 psig to produce sulfur (which maximum pressure is stated to be the essence of the invention), and a solution of a relatively minor amount of thiosulfate compound which can be disposed of or recycled to maintain a thoroughly wetted support bed. The stated advantage to the low pressure of the second stage is that the oxidation is performed in a vaporous phase, whereas in the prior art the oxidation is performed in a liquid phase.

The process of the present invention, unlike Li, requires that the geothermal steam be contacted with the oxidation catalyst at a temperature no higher than the saturation temperature, and unlike Urban requires a reactor pressure of at least 30 psig. The process of the present invention has been found to be uniquely suitable for the processing of geothermal steam where the objective is to remove small amounts of hydrogen sulfide rather than produce free sulfur for subsequent sale or commercial use.

SUMMARY OF THE INVENTION

Accordingly, the present invention, in one embodiment, is a process for removing hydrogen sulfide from geothermal steam containing less than 1000 ppm by volume of hydrogen sulfide. At least a stoichiometric (based on the formula $2H_2S + O_2 \rightarrow 2H_2O + 2S$) amount of free oxygen is added to the geothermal steam and the steam is contacted at a pressure of at least 30 psig and a temperature not greater than the saturation temperature of the steam with a bed of oxidation catalyst comprising activated carbon, a refractory inorganic oxide or a metal phthalocyanine wetted with an aqueous solution of thiosulfates, sulfates, or polysulfides to convert the hydrogen sulfide and obtain steam of reduced hydrogen sulfide content.

In a second embodiment, the present invention is the process wherein the pH of the aqueous solution used to wet the bed is maintained in excess of 5.0.

DESCRIPTION OF THE INVENTION

The present invention is concerned with the removal of hydrogen sulfide from steam from any source, but particularly geothermal steam which usually contains less than 1,000 ppm by volume of hydrogen sulfide. The basic flow scheme is quite simple, i.e. the steam is mixed with an amount of oxygen stoichiometric to the amount of $H_2S$ to be removed. The source of oxygen is most conveniently air which may be the vehicle by which the oxygen is supplied. The steam-oxygen mixture is then passed through the catalyst bed wetted with a solution of the reaction products. The hydrogen sulfide must necessarily be removed at the high pressure, i.e. at least 30 psig at which the geothermal steam is obtained, because it is the high pressure that provides the energy extracted by the downstream power generating equipment. I stated in my earlier aforementioned patent that the use of the vapor phase with the wetted catalyst bed allows an equilibrium to occur which increases the selectivity of oxidation in the presence of the catalyst and oxygen, and thus a relatively low pressure (not greater than 20 psig) was desirable to facilitate the vaporous phase. Of course, the vaporous phase can be accomplished at the high pressure of this process by conducting the reaction at an appropriately high temperature, but not greater than the saturation temperature of the steam. The presence of at least 500 ppm by volume of $CO_2$ which is common in geothermal steam is helpful in that it is highly conducive to vapor phase oxidation because of the severe limitation of the solubility of $H_2S$ in water caused by the presence of $CO_2$.

It was also stated in my above earlier patent that the conditions employed created a greater amount of sulfur (in excess of 80% conversion of $H_2S$ to sulfur) and a minimization of thiosulfate-containing compounds. That statement was, of course, true at the conditions employed in the second oxidation zone, however, I have found that the very different conditions of the present invention, i.e. high pressure (the pressure at which the steam is obtained from the geothermal well) and temperature and a relatively low $H_2S$ concentration, yield primarily thiosulfates, sulfates and polysulfides (in excess of 90% conversion of $H_2S$ to those compounds), although the preferred pH range employed by the present invention is similar to that used in the second oxidation zone of my earlier patent. Conversion to these products is a very desirable situation, because the primary objective in converting the small amount of $H_2S$ in the geothermal steam is not to recover free sulfur, but to get rid of the $H_2S$ in the simplest and most convenient manner so that the steam can be used in an energy recovery system. The soluble sulfur compounds obtained in the reactor of the preferred embodiment of this invention are easily washed away and disposed of as compared to the obvious problems created by the generation of large amounts of free sulfur, particularly by the plugging of process equipment with solid sulfur. In a most preferred embodiment of the invention, at least a portion of the aqueous solution of the sulfur compounds is recirculated to the catalyst bed to provide the desired wetting and washing away of newly formed compounds.

The catalysts which may be used in the process of the present invention are activated carbon, such as activated wood charcoal, bone charcoal, etc; a refractory inorganic oxide such as silica gel or alumina; or a metal phthalocyanine such as cobalt phthalocyanine. If activated carbon or a refractory inorganic oxide are used, the pH of the aqueous solution used to wet the bed should be in excess of 5.0 to convert the $H_2S$ to soluble salts. This may be accomplished by the addition of sodium carbonate to the reaction mixture. If a metal phthalocyanine is used, sufficient alkalizing agent should be present to maintain at least 6.6 pH in order to obtain a sulfur compound rather than free sulfur. Ammonia is the ideal alkalizing agent for the latter catalyst since it usually occurs naturally in geothermal steam. The ammonia-to-hydrogen sulfide ratio should be at least about 0.5:1.0 when the catalyst is metal phthalocyanine. If it is desired, however, to obtain elemental sulfur, the metal phthalocyanine used at a pH less than about 6.6 would be the preferred choice because that catalyst gives the highest rate of conversion of the sulfide.

The preferred catalyst is a metal phthalocyanine supported on a solid support such as a carbon base at concentration levels of about 0.1% to about 3%. The active ingredient itself is the metal phthalocyanine, preferably iron, cobalt, vanadium or manganese or a polymeric phthalocyanine, (Moser Thomas, "Phthalocyanine Compounds," ACS Monogram Series No. 159, p. 329) derivative of these metals. The sulfonate, carboxylate or nitrate derivatives of these phthalocyanines are preferred because of their solubility properties.

With regard to the base, activated carbons having the majority of their pore diameters in the 730 angstrom size are preferred. Also preferred are carbons having a bulk density of less than 0.55 grams/cc, a pore volume greater than 0.3 cc/gram, being derived from lignin, lignite, peat or coal and having a capacity to retain oxygen in an available form. Examples of these carbons are Norit PKDA, Calgon's Types BPL and CPG and West Virginia's Pulp and Paper Company's type WVW. Especially preferred are carbons containing heavy metals as natural constituents, such as the Darco carbons, containing as much as 1% iron, iron being the most preferred metal. The Darco carbons are produced by Atlas Chemical Industries. Although the activated carbons are preferred, amorphous carbons can be used as a support where pressure drop through the catalyst bed becomes a major factor for upstream treating. The maximum permitted pressure drop is considered to be about 5 psi. The carbons may be in a granular form for fixed bed operation or as a powder for slurry operation.

ILLUSTRATIVE EMBODIMENT I

In this embodiment the geothermal stream enters the process and excess water (condensate) is removed, although in those cases where the entrained water is not severely scaling, the entire mixed phase geothermal steam may be passed over the catalyst as follows. The saturated steam is mixed with air and passed into a reactor in which a bed of ceramic Berle saddles, 1" size, are used to obtain good contact between liquid and steam. A slurry of 5 wt. % powdered activated carbon, containing 0.3 wt. % cobalt phthalocyanine monosulfonate adsorbed on it, is recycled over the Berle saddle bed in a 10 wt. % solution of sodium thiosulfate and carbonate, the Berle saddles when in contact with the slurry comprising a catalyst bed. The pressure drop is less than 5 lbs. through the bed. The steam and liquid leave the bottom of the bed and pass into a separator where the steam is disengaged from the liquid. The major part of the liquid is recycled directly to the adsorber. A drag stream is taken to maintain liquid balance. The catalyst is readily filtered from the stream and is returned to the recycle stream. The clean effluent is sent to disposal.

The feed stream comprises 1,000,000 lbs./hr. of saturated steam at 320° F., 77 psig and containing 564 ppm $H_2S$ (500 ppm $S^=$). Other process details are:

28,000 cu. ft. of air/hr. at 70° F., 760 mm = O/S of 1.9
2,000 lbs. of $NaCO_3$/hr. ($Na_2^+/S = 1.25$)
Recycle pH = 11.–10.
Recycle rate 10,000 gals./hr.
5 wt. % solids as suspended catalyst
Size of Berle saddle bed, 10 × 10 ft. of 1" Berle saddles The process converts all of the sulfide present with less than one percent of the sulfide being converted to elemental sulfur.

ILLUSTRATIVE EMBODIMENT II

The second operation is one in which pressure drop is not of concern, such as in the venting of waste steam from a well often referred to "stacking," and where the steam will not be passed to energy recovery means to which free sulfur and sulfuric acid would be detrimental. The catalyst bed consists of a 10 × 13 ft. cylinder of catalyst for the purpose of illustration, but it is understood that this volume of catalyst can be distributed among a group of reactors operating in parallel.

The feed stream used has the same composition as that of Illustrative Embodiment I. Details of plant operations are:

Feed.
1,000,000 pounds of steam per hour
19,200 cu. feet/hr. of air at 70° F. O/S = 1.3
Recycle rate 10,000 gals. per hour
Catalyst.
560 cu. ft. of cat. (11,200 lbs. at 20 lbs./cu. ft.) (10 × 30 mesh size U.S. Sieve Series)

The process will produce 475 lbs. of elemental sulfur per hour and 77 pounds of sulfuric acid: sulfide conversion is 99.9+%.

Thus, in certain cases where economic considerations are uppermost, such as in the venting of waste steam, alkali addition for pH adjustment to a relatively high value (over 5.5) is not necessary. It is advantageous, however, to add sufficient basic material such as caustic or ammonia to maintain a pH of 2.6–3.0 for maximum oxidation rate, and to prevent excessive corrosion. It is also recommended that the recycle liquid be cooled to produce as much water as possible. With the addition of ammonia and sufficient cooling of the recycle stream, the capacity of the system was raised 20%.

I claim as my invention:

1. A process for removing hydrogen sulfide from geothermal steam containing less than 1000 ppm by volume of hydrogen sulfide comprising adding at least a stoichiometric amount of free oxygen to the geothermal steam and contacting the steam at a pressure of at least 30 psig and a temperature not greater than the saturation temperature of said steam with a bed of oxidation catalyst comprising activated carbon, a refractory inorganic oxide or a metal phthalocyanine wetted with an aqueous solution of thiosulfate, sulfates, or polysulfides to convert the hydrogen sulfide and to obtain steam of reduced hydrogen sulfide content.

2. The process of claim 1 wherein at least a portion of said aqueous solution is recycled to said catalyst bed to effect the wetting of said bed.

3. The process of claim 1 wherein said pressure is substantially the pressure at which said geothermal steam is obtained from the geothermal well.

4. The process of claim 1 wherein said geothermal steam contains at least 500 ppm by volume of $CO_2$.

5. The process of claim 1 wherein said oxidation catalyst comprises activated carbon or a refractory inorganic oxide.

6. The process of claim 1 wherein the pH of said aqueous solution used to wet said bed is maintained in excess of 5.0.

7. The process of claim 6 wherein said pH is maintained by the addition of sodium carbonate to said aqueous solution used to wet said bed.

8. The process of claim 1 wherein said oxidation catalyst comprises a metal phthalocyanine.

9. The process of claim 8 wherein said metal phthalocyanine catalyst is dispersed on a solid support.

10. The process of claim 9 wherein said solid support comprises activated carbon.

11. The process of claim 8 wherein said metal phthalocyanine comprises iron, cobalt, vanadium or manganese phthalocyanine, or polymeric phthalocyanine derivative thereof.

12. The process of claim 8 wherein the pH of said aqueous solution used to wet said bed is maintained in excess of 6.6.

13. The process of claim 12 wherein ammonia is contained in said geothermal steam in a ratio to hydrogen sulfide of at least about 0.5:1.0.

* * * * *